United States Patent
Cho (10) Patent No.: US 7,585,342 B2
(45) Date of Patent: Sep. 8, 2009

(54) POLYCRYSTALLINE SUPERABRASIVE COMPOSITE TOOLS AND METHODS OF FORMING THE SAME

(75) Inventor: Hyun Sam Cho, Salt Lake City, UT (US)

(73) Assignee: ADICO, Asia Polydiamond Company, Ltd., Kyungki-do (KR)

( * ) Notice: Subject to any disclaimer, the term of this patent is extended or adjusted under 35 U.S.C. 154(b) by 226 days.

(21) Appl. No.: 11/495,807

(22) Filed: Jul. 28, 2006

(65) Prior Publication Data

US 2008/0023230 A1    Jan. 31, 2008

(51) Int. Cl.
*C09K 3/14* (2006.01)
*B24D 3/02* (2006.01)
*C09C 1/68* (2006.01)
*B24D 18/00* (2006.01)
*B24D 3/00* (2006.01)
*B21K 5/04* (2006.01)

(52) U.S. Cl. .............................. 51/309; 51/307; 51/308; 51/293; 76/108.1

(58) Field of Classification Search ................... 51/293, 51/297, 307, 308, 309; 76/108.1, 108.2, 76/108.4, 108.6
See application file for complete search history.

(56) References Cited

U.S. PATENT DOCUMENTS

| | | |
|---|---|---|
| 3,745,623 A | 7/1973 | Wentorf, Jr. et al. |
| 3,785,093 A | 1/1974 | Vereschagin et al. |
| 3,850,591 A | 11/1974 | Wentorf, Jr. |
| 3,949,062 A | 4/1976 | Vereschagin et al. |
| 4,224,380 A | 9/1980 | Bovenkerk et al. |
| 4,255,165 A | 3/1981 | Dennis et al. |
| 4,374,900 A | 2/1983 | Hara et al. |
| 4,525,179 A * | 6/1985 | Gigl .............................. 51/309 |
| 4,604,106 A * | 8/1986 | Hall .............................. 51/293 |
| 4,690,691 A | 9/1987 | Komanduri |
| 4,797,138 A | 1/1989 | Komanduri |
| 5,435,403 A | 7/1995 | Tibbitts |
| 5,590,729 A | 1/1997 | Cooley et al. |
| 5,611,251 A * | 3/1997 | Katayama .................. 76/108.6 |
| 5,776,355 A | 7/1998 | Martin |
| 6,100,494 A | 8/2000 | Nolan |
| 6,106,585 A | 8/2000 | Packer et al. |
| 6,145,608 A | 11/2000 | Lund et al. |

(Continued)

*Primary Examiner*—Karl E Group
*Assistant Examiner*—Noah S Wiese
(74) *Attorney, Agent, or Firm*—Thorpe North & Western LLP (57) ABSTRACT

A polycrystalline superabrasive composite tool can be produced using high pressure high temperature processes allowing for increased thermal resistance, wear resistance and toughness of abrasive tools, and additionally allowing for increased effective thickness of abrasive tools. A polycrystalline superabrasive compact can include a support substrate and a superabrasive polycrystalline layer having a diffusion bridge embedded therein that includes a carbide former. Additionally, a working layer can be attached adjacent to the superabrasive polycrystalline layer and opposite the support substrate to form a drill bit sandwich segment. The diffusion bridge matrix of the present invention allows for a new welding phase at each interface between the superabrasive polycrystalline layer and support substrate and between the polycrystalline layer and the metal working layer, thus eliminating delamination failure at the interfaces. The superabrasive polycrystalline layer can include superabrasive particles of varying particle sizes such that the final composite tool is tailored for specific abrading characteristics. The polycrystalline superabrasive composite tools can be incorporated for use in machining, drilling, grinding, cutting, polishing and similar abrasive applications.

24 Claims, 2 Drawing Sheets

U.S. PATENT DOCUMENTS 6,482,244 B2 11/2002 Tselesin
6,739,214 B2 5/2004 Griffin et al.
6,797,326 B2 9/2004 Griffin et al.
2005/0050801 A1* 3/2005 Cho et al. ............... 51/293
2005/0166463 A1* 8/2005 Goudemond et al. ......... 51/309

* cited by examiner

POLYCRYSTALLINE SUPERABRASIVE COMPOSITE TOOLS AND METHODS OF FORMING THE SAME

BACKGROUND OF THE INVENTION

Polycrystalline superabrasive materials like polycrystalline diamond (PCD) and polycrystalline boron nitride (PCBN) are commonly demanded with high wear resistance, high toughness, and high thermal resistance as they are applied in abrading of material which is difficult to machine, drill, or cut. Conventional polycrystalline superabrasive tools tend to satisfy one property at the sacrifice of another. For example, higher wear resistance typically results in lower toughness. Each property does not correlate with one another with respect to their behavior and property values in the materials that are a key ingredient in ultrahard, superabrasive tools. Thus, the industry continues to seek tools which satisfy all of the above properties.

In order to achieve certain properties in polycrystalline diamond composite tools, the polycrystalline diamond layer has typically been increased in thickness. An increase in thickness generally results in an increase in technical difficulties associated with making quality polycrystalline diamond composites. For example, infiltration of sintering aid through a thicker layer tends to be limited such that sintered diamond quality tends to decrease with increased layer thicknesses. As technical difficulties associated with making quality polycrystalline diamond composite tools increase, the resulting thermomechanical properties in the polycrystalline diamond composite tools have diminished reliability. As such, composite tools having increased thermal resistance, toughness and wear resistance, and methods of forming the same continue to be sought through ongoing research and development efforts.

SUMMARY OF THE INVENTION

The present invention provides new polycrystalline superabrasive composite tools especially designed for much wider applications than existing polycrystalline composite tools having limited thermomechanical properties, wear resistance and toughness. The present invention also provides methods for forming such polycrystalline superabrasive composite tools. Therefore, the polycrystalline superabrasive composite tools of the present invention can be a viable alternative for existing products in machining, drilling, grinding, cutting and polishing applications.

In accordance with the present invention, a polycrystalline superabrasive composite tool includes a support substrate and a superabrasive polycrystalline layer having a diffusion bridge matrix embedded therein. The diffusion bridge matrix includes a carbide former. In one aspect of the present invention, a metal working layer can be adjacent to the superabrasive polycrystalline layer and opposite the support substrate to form a sandwich segment.

Additionally, one aspect of the present invention includes a method of forming a polycrystalline superabrasive composite tool. This method can include embedding a diffusion bridge matrix in a particulate superabrasive layer disposed on a support substrate. The diffusion bridge matrix can include a carbide former. Additionally, this method includes bonding the support substrate and the particulate superabrasive layer to form a polycrystalline superabrasive composite tool, preferably via sintering under high pressure and temperature.

The present invention can achieve thermomechanical property values that are at least equivalent to conventional PCD with respect to the properties of toughness and wear resistance. In particular, the conventional PCD cutter in oil and gas drilling applications requires a high toughness and good wear resistance to satisfy an acceptable removal rate of earth material. In the present invention, the polycrystalline superabrasive composite tool comprises a superabrasive polycrystalline layer having a diffusion bridge matrix with a carbide former. This superabrasive polycrystalline layer can bolster bulk toughness and increase wear resistance as a result of less vulnerability to hairline cracks caused by constant shock loading to the composite tool during drilling and other applications where the cutting element is exposed to heavy vibration and torque. Additionally, the bulk thermomechanical properties of the composite tool of the present invention can be even further strengthened by improved and more reliable uniform polycrystalline microstructure throughout the superabrasive polycrystalline layer. Furthermore, thermal resistance is further improved by an adjustment of binder content with more thermally stable bonding agents like tungsten and silicon. Wear resistance can also be increased as a result of the increase of thermal resistance of the superabrasive polycrystalline layer, which has embedded therein a diffusion bridge matrix comprising a carbide former.

Improved reliability of the polycrystalline superabrasive composite tools in accordance with the present invention can be achieved in light of a better controlled design flexibility for higher diamond content, desirable diamond grain size, even down to the finer grains, and optimum binder content and distribution is attained in the high pressure high temperature diffusion bridge matrix-assisted reaction under high pressure high temperature polycrystalline sintering process. Therefore, the polycrystalline superabrasive composite tool of the present invention can be substantially free from the current inherent high pressure high temperature polycrystalline sintering difficulties encountered in conventional polycrystalline composite tool manufacturing processes.

The diffusion bridge matrix can exist in many forms including circles, cubes, honeycomb, grid and saw teeth, and can further exist in various sizes depending on the desired size of the final product. The diffusion bridge matrix is designed to further provide more cutting points and edges during performance at the contact point of polycrystalline diamond and earth material that are both sharp and tough. As a result, the useful life of the polycrystalline superabrasive composite tool of the present invention extends beyond that of conventional polycrystalline composite tools. For example, the current polycrystalline composite cutter bit is no longer useful when the polycrystalline cutter is only partly worn out and left still with more than three fourths of polycrystalline diamond content because of dulling problems and no remaining sharp cutting points.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "a substrate" includes one or more of such substrates, and reference to "the layer" includes reference to one or more of such layers.

Definitions

In describing and claiming the present invention, the following terminology will be used in accordance with the definitions set forth below.

As used herein, "diamond" refers to a crystalline structure of carbon atoms bonded to other carbon atoms in a lattice of tetrahedral coordination known as $sp^3$ bonding and includes amorphous diamond. Specifically, each carbon atom is surrounded by and bonded to four other carbon atoms, each located on the tip of a regular tetrahedron. The structure and nature of diamond, including its physical properties are well known in the art.

As used herein, "diffusion bridge matrix" refers to a metallic matrix which acts as a bridge for enhancing diffusion of materials therefrom throughout an adjacent superabrasive material. Diffusion bridge matrix materials can typically be structures having multi-celled walls such as walled partitions, meshes, multi-cell matrices, and the like. The diamond bridge matrix can contain a stable and strong carbide former. Preferred carbide formers can include tungsten, molybdenum, tantalum, zirconium, vanadium and their carbides and combinations or alloys thereof. The walled multi-cell matrix can include a grid, honeycomb or other shaped patterns.

As used herein, "bonded", "bonding", and the like refer to carbide bonding, nitride bonding, boride bonding, mechanical bonding, and/or sintering of superabrasive particles. For example, diamond superabrasive particles can be bonded using a sintering aid such as cobalt to form a polycrystalline structure. Further, the addition of carbide and/or nitride formers such as titanium can provide for formation of chemical bonds between the diamond, CBN, and/or other components of the superabrasive layer to form a bonded mass of superabrasives.

As used herein, "forming", when used in conjunction with superabrasive layers, refers to attaching a superabrasive layer to a surface. As such, the superabrasive layer can be provided as a powdered mass which is then shaped or otherwise formed into a coherent mass directly on the substrate. Alternatively, the superabrasive layer can be formed on a surface by providing a coherent, partially sintered, or sintered superabrasive layer which is independently produced and then "formed" on the surface by adhesion, brazing or other like methods.

As used herein, "substantial" when used in reference to a quantity or amount of a material, or a specific characteristic thereof, refers to an amount that is sufficient to provide an effect that the material or characteristic was intended to provide. Therefore, "substantially free" when used in reference to a quantity or amount of a material, or a specific characteristic thereof, refers to the absence of the material or characteristic, or to the presence of the material or characteristic in an amount that is insufficient to impart a measurable effect, normally imparted by such material or characteristic.

As used herein, "high pressure" and "high temperature" refer to pressures and temperatures within the stability field of diamond or CBN. These pressures and temperatures can vary widely and are well known to those skilled in the art. For example, as pressures increase, lower temperatures can be used to successfully sinter diamond and CBN. Typical pressures can range from about 1 GPa to about 7 GPa and temperatures often range from about 1,200° C. to about 1,500° C. Those skilled in the art will recognize that conditions outside these ranges can be used depending on the apparatus and specific superabrasive properties, e.g., particle size, added components, etc., and such are considered within the scope of the present invention.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 µm to about 5 µm" should be interpreted to include not only the explicitly recited values of about 1 µm and about 5 µm, but also include individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

The invention

Figure 1:
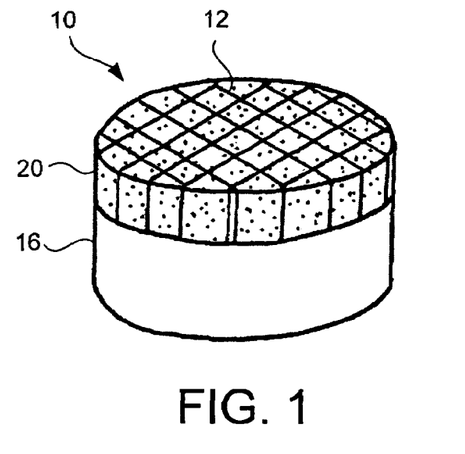
FIG. 1 shows a perspective view of a polycrystalline superabrasive composite tool in accordance with one embodiment of the present invention.

In accordance with the method of the present invention as shown in FIG. 1, a polycrystalline superabrasive composite tool 10 can be formed by embedding a diffusion bridge matrix 12 containing a carbide former in a particulate superabrasive layer disposed on a support substrate 16. The support substrate and the particulate superabrasive layer can be bonded to form a polycrystalline superabrasive composite tool 10 as shown in FIG. 1. The resulting polycrystalline superabrasive composite tool of the present invention comprises a support substrate 16 and a superabrasive polycrystalline layer 20 having a diffusion bridge matrix 12 embedded therein. Additionally, the diffusion bridge matrix includes a carbide former. In one embodiment of the present invention the carbide former in the diffusion bridge matrix 12 comprises a member selected from the group consisting of molybdenum, tungsten, tantalum, zirconium, vanadium, and mixtures or composites thereof, although other carbide formers can also be suitable. Currently, the preferred carbide formers include Mo, Ta, Zr and alloys thereof,-and the most preferred carbide former can include Mo.

The superabrasive polycrystalline layer of the present invention can be much thicker than superabrasive polycrystalline segments in typical PCD composite tools. In a preferred embodiment of the present invention, the superabrasive polycrystalline layer has a thickness ranging from about 2.0 mm to about 4.0 mm, which is substantially thicker than the about 0.60 mm thickness of typical polycrystalline segments for composite tools. However, the present invention can also be used in production of thinner tools. Generally, the polycrystalline layer can have a thickness from about 0.4 mm to about 5.0 mm, although greater thicknesses can also be achieved if desired.

In a further aspect of the present invention, the superabrasive polycrystalline layer 20 of the present invention can include the diffusion bridge matrix 12. The diffusion bridge matrix aids in the effectiveness and uniformity of catalyst diffusion throughout the entire superabrasive polycrystalline layer 20, thus ensuring an acceptable quality of PCD. Importantly, the diffusion bridge matrix can contribute to an elimination of cracking and/or layer delamination problems occurring at the interface of the superabrasive polycrystalline layer 12 and the support substrate 16 during high pressure high temperature sintering and during use. Additionally, the diffusion bridge matrix bolsters the bulk toughness of the superabrasive polycrystalline layer and serves as a chip arrester, thus decreasing the vulnerability of the superabrasive polycrystalline layer to hairline cracks induced by constant shock loading to the composite tool during drilling.

In one preferred embodiment, the diffusion bridge matrix further comprises a sintering aid. In one aspect, the sintering aid can be present in an amount from about 2 to about 50 volume percent. The use of a sintering aid, such as cobalt, is used for promoting interparticle growth and sintering together superabrasive particles to form the superabrasive polycrystalline layer 20. Further, the addition of carbide and or nitride formers such as titanium can provide for formation of chemical bonds between the components of the particulate superabrasive layer 14. In the presence of a sintering aid and under high pressure high temperature conditions, an additional metallic phase is formed at the interface between the superabrasive polycrystalline layer 20 and the support substrate 16. This additional metallic phase overcomes the inherent residual stress generated from the bonding of two different materials, such as tungsten carbide and superabrasive particles, and minimizes or eliminates resultant cracking and delamination at the interface between the support substrate and superabrasive polycrystalline layer by creating a welding layer with the aid of the diffusion bridge matrix 12. Additionally, the amount of sintering aid, such as cobalt, that is diffused into the polycrystalline superabrasive layer from the diffusion bridge matrix is less than that in typical PCD tools. For example, the present invention can include an amount of sintering aid from about 2 vol % to 5 vol %, and preferably about 2 vol % to about 3 vol %. Therefore, the adverse thermochemical and thermophysical reaction of the sintering aid or metal binder during its tool service is considerably lower than that of standard PCD tools.

The thickness of the diffusion bridge matrix 12 is relevant for purposes of reducing or eliminating cracking and delamination problems at the interface between the superabrasive polycrystalline layer 20 and the support substrate 16. Thus, in one embodiment of the present invention, the diffusion bridge matrix can have a thickness equal to a thickness of the superabrasive polycrystalline layer 20. In this case the diffusion bridge matrix acts as a tie between the substrate and outer working surface or opposite layer in a sandwich segment. In another embodiment, the diffusion bridge matrix has a thickness that is less than a thickness of the superabrasive polycrystalline layer. And in yet another embodiment, the diffusion bridge matrix has a thickness that is greater than a thickness of the superabrasive polycrystalline layer. The final sintered superabrasive polycrystalline layer can have a thickness which is slightly thinner than the pre-sintered thickness of the particulate superabrasive layer 14. Those skilled in the art are well acquainted with taking these changes in dimension into account in designing appropriate molds.

Figure 2:
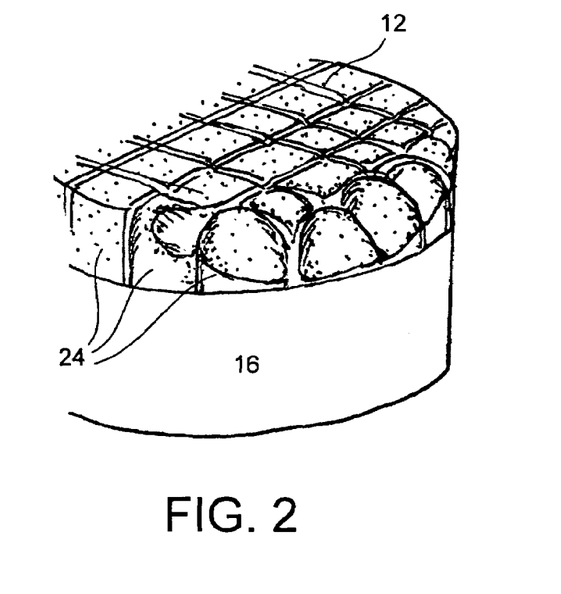
FIG. 2 shows a partial magnified view of the polycrystalline superabrasive composite tool of FIG. 1 after exposure to use in accordance with one embodiment of the present invention.
Figure 3:
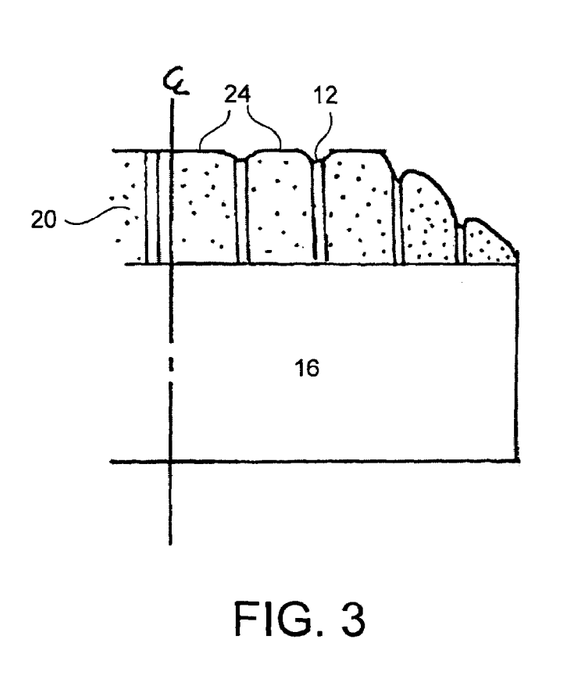
FIG. 3 shows a side view of the polycrystalline superabrasive composite tool of FIG. 1 after exposure to use in accordance with one embodiment of the present invention.

In a preferred embodiment of the present invention the diffusion bridge matrix 12 segments portions of the superabrasive polycrystalline layer. A magnified view of the segmented portions 24 is shown in FIG. 2. Each segmented portion can be individually worn because the softer diffusion bridge matrix 12 wears at a faster rate than the polycrystalline material. As a result, the tool maintains multiple cutting surfaces as the tool wears. FIG. 3 illustrates this individualized wear pattern. In this manner, the tools of the present invention can maintain a sharper and useful cutting edge for a longer tool life.

The diffusion bridge matrix can be embedded uniformly throughout the superabrasive polycrystalline layer as is shown in FIG. 1. Placement and distribution of the diffusion bridge matrix can affect the uniformity and effectiveness of catalyst diffusion throughout the entire superabrasive polycrystalline layer and further allows for a thicker superabrasive polycrystalline layer. In one aspect of the present invention, the segmented portions 24 in the superabrasive polycrystalline layer 20 serve as a chip arrester, thus decreasing the vulnerability of the superabrasive polycrystalline layer to hairline cracks induced by constant shock loading to the composite tool during drilling.

Figure 4:
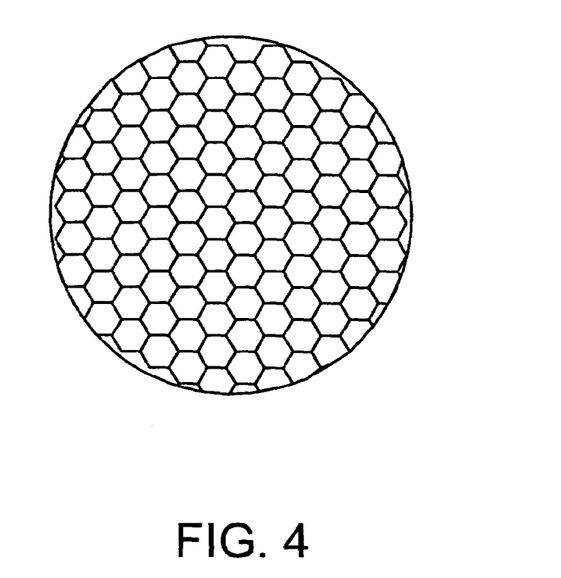
FIG. 4 shows a perspective view of diffusion bridge matrix having a honeycomb pattern in accordance with one embodiment of the present invention.

The diffusion bridge matrix can be any structure which provides a diffusion conduit for carbide/nitride formers and optional sintering aid into the layer of superabrasive particles. In a preferred embodiment, the diffusion bridge matrix of the polycrystalline superabrasive composite tool can be selected from the group consisting of walled multi-cell matrix, mesh and combinations thereof. The walled multi-cell matrix can be a grid, honeycomb or other shaped structure. FIG. 4 depicts a diffusion bridge matrix having a honeycomb shaped structure. Thus, in many embodiments of the present invention the diffusion bridge matrix can be a continuous structure. Alternatively, the diffusion bridge matrix can be a discontinuous structure of discrete walls or segments which are embedded in the polycrystalline layer. The diffusion bridge matrix can be formed in any suitable manner. For example, powdered starting materials can be sintered and/or extruded to form a suitable structure. Alternatively, materials can be welded or brazed together to form an interconnected diffusion bridge matrix.

One of the advantages of the present invention resulting from the presence of the diffusion bridge matrix is to make possible a superabrasive polycrystalline layer having effective thickness greater than 1.50 mm with substantially no loss of microstructure homogeneity, regardless of the superabrasive particle size. Although the present invention is not particularly limited, the polycrystalline layer can typically be from about 0.5 mm to about 1.0 mm, and preferably from about 0.6 mm to about 0.7 mm. Oftentimes, in typical PCD and PCDN composite tools, polycrystalline layer thicknesses greater than about 1.6 mm to about 2 mm can result in polycrystalline structure which is non-homogenous and is subject to premature failure, depending on the superabrasive particle size.

The support substrate of the present invention can include a variety of materials and can be almost any material suitable for a particular application. For example, high impact and intensive cutting applications can require a support substrate comprised of metal carbides, while abrading of softer materials such as wood, plastics, or soft rock such as limestone, marble and the like, can allow for use of softer substrate materials such as ceramics, polymeric resins, and the like. Typical metal carbides include, without limitation, cemented tungsten carbide, cemented titanium carbide, cemented tantalum carbide, and mixtures, alloys or composites thereof. In a preferred embodiment, the support substrate comprises a refractory metal carbide. In FIG. 1, the support substrate 16 is shown as a cylindrical disc, however it will be understood that the substrate can be almost any shape depending on the intended application and the available high-temperature high pressure apparatus.

Figure 5:
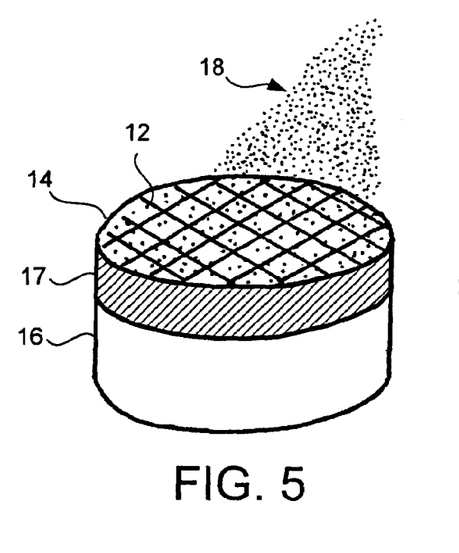
FIG. 5 shows a step in a method of forming a polycrystalline superabrasive composite tool wherein a diffusion bridge matrix is first placed on a support substrate and is then covered with superabrasive particles in accordance with one embodiment of the present invention.

In the method of forming a superabrasive composite tool in the present invention, the step of embedding can be accomplished by placing the diffusion bridge matrix 12 on the support substrate 16 within a container or sleeve 17 as shown in FIG. 5. The diffusion bridge matrix can then be covered with superabrasive particles 18. Optionally, the diffusion bridge matrix can be pressed into loose superabrasive particles in order to embed the matrix therein. The superabrasive particles can be of almost any size and suitable sizes can be chosen based on the intended application. For example, coarse grits can be used in aggressive cutting applications, while bearing surfaces or fine polishing tools may require finer particle size. Additionally, in some applications finer particle sizes may be mixed with coarse particle sizes in order to increase packing density and hardness of the polycrystalline layer. In one aspect, combining various particle sizes can minimize the quantity and size of interstitial voids among particles. Superabrasive particle sizes can range from 2.0 µm to 45 µm, although particle sizes outside this range can be used. Further superabrasive particle sizes from about 2.0 µm to 35 µm are typical. Currently preferred superabrasive particle sizes range from about 1.0 µm to 45.0 µm. Superabrasives suitable for use in the present application can include diamond, cubic boron nitride (CBN), and mixtures thereof. However, the principles of the present invention can be applied using other superabrasive particles such as amorphous diamond, nanodiamond, and other known superabrasive materials. The particulate superabrasive layer can further include a variety of other components known to those skilled in the art such as, but not limited to, metal binders, sintering aids, organic binders, metal carbide, filler, and the like.

The superabrasive particles typically do not form a coherent mass suitable for mechanical applications without a metal binder or sintering aid such as cobalt, nickel, iron, manganese, or their alloys. Such sintering aids can be included in the support substrate 16, e.g., cemented tungsten carbide. Alternatively, in one embodiment, the metal binder or sintering aid can be physically mixed with the superabrasive particles prior to placement in the high pressure high temperature apparatus. When mixed with the superabrasive particles, the sintering aid can be present in an amount from about 1 to 30 volume percent. Such metal binders can be any conventional sintering aid, infiltrant, carbon solvent, or other metal alloy used in producing coherent PCD or PCDN tools. For example, metal binders can include carbide, nitride, or boride forming metals such as nickel, cobalt, manganese, iron, silicon, aluminum, titanium, vanadium, chromium, zirconium, molybdenum, tungsten, and alloys thereof. Upon heating, the metal binder or sintering aid melts and/or flows throughout the superabrasive polycrystalline layer 20 and can provide additional strength through a reaction at a grain boundary between the metal binder and the superabrasive particles such that interstitial voids among particles are at least partially filled. The molten metal binder or sintering aid provides additional mechanical strength to the particulate superabrasive layer and can provide additional strength through a reaction at a grain boundary between the sintering aid and the superabrasive particles resulting in formation of carbide, boride, and/or nitride bonds. Depending on the additional components of the superabrasive layer, the superabrasive particles can be bound together by mechanical forces, chemical bonds as in the case of carbide, nitride, or boride forming metals, or the superabrasive particles can be sintered together as in the case of carbon solvent metals such as Co, Fe, Ni, Mn, Al, Si, Ti, V, Cr, Ta, Zr, Mo, W, and their alloys. Various alloys present differing melting temperatures and may be more or less appropriate for a particular application. Specific such alloys can be selected based on the particular application.

In order to increase the workability of the polycrystalline superabrasive composite tool, an organic binder can be included in the superabrasive particulate layer as is well known in the art. Typically, upon heating, the organic binder will be removed or otherwise decompose and is preferably not part of the final polycrystalline composite tool.

In the method of the present invention, the precursor assembly of the polycrystalline superabrasive composite tool can be placed in a high pressure high temperature apparatus such as a belt-type press, multi-anvil apparatus, bar-type apparatus, torrid apparatus, or any other high pressure high temperature apparatus capable of achieving pressures and temperatures sufficient to cause superabrasive bonding and/or growth. Upon heating at high pressures, the superabrasive particles in the particulate superabrasive layer are bonded together to form the superabrasive polycrystalline layer. In one aspect of the present invention, the superabrasive polycrystalline layer includes superabrasive particles bonded together by sintering. The final sintered superabrasive polycrystalline layer will have a thickness which will be slightly thinner than the pre-sintered thickness. Once placed in the high pressure high temperature apparatus, the superabrasive particles can then be sintered to form a polycrystalline superabrasive composite tool. As a general guideline, the sintering process can occur at a temperature from about 1200° C. to about 1500° C. and a pressure of from about 1 GPa to about 7 GPa, although conditions outside this range can be used depending on the high pressure high temperature apparatus and particular superabrasive particles chosen. As the pressure is increased, even lower temperatures can be used to achieve sintering of superabrasive particles using metal binders and sintering aids discussed herein. However, almost any pressure can be used, provided it is sufficient to prevent conversion of diamond to graphite or the conversion of CBN to hexagonal boron nitride.

Figure 6:
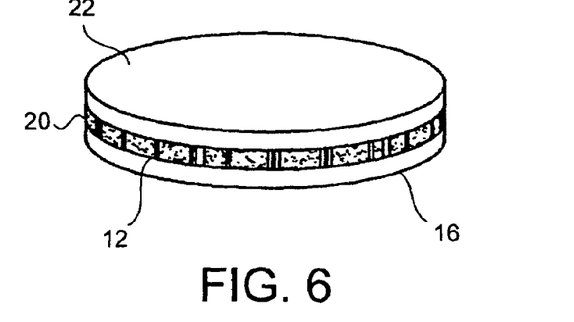
FIG. 6 shows a perspective view of a polycrystalline superabrasive composite tool having a metal working layer in accordance with one embodiment of the present invention.

The method of the present invention can further include adding a metal working layer 22 adjacent to the particulate superabrasive layer 14 and opposite the support substrate 16 prior to bonding. This additional step results in a polycrystalline superabrasive composite tool as shown in FIG. 6, comprising three distinct layers: a support substrate 16, a superabrasive polycrystalline layer 20 having a diffusion bridge matrix 12 including a carbide former, and a metal working layer 22 adjacent to the superabrasive polycrystalline layer and opposite the support substrate. In one embodiment of the present invention, the metal working layer and the support substrate have thicknesses which differ by about 10% to about 100%. In a preferred embodiment, the diffusion bridge matrix 12 embedded in the superabrasive polycrystalline layer 20 extends from the support substrate 16 through the superabrasive polycrystalline layer to the metal working layer. In one embodiment, the support substrate 16 and the metal working layer 22 comprise tungsten carbide. In this embodiment, the superabrasive polycrystalline layer which is protected and supported on each side by strong and hard tungsten carbide can have an increased thickness, e.g. ranging from 2.0 mm to 4.0 mm.

The diffusion bridge matrix 12 can also aid in the effectiveness and uniformity of catalyst diffusion throughout the entire superabrasive polycrystalline layer 20. The uniformity of diffusion is particularly helpful in cases where the superabrasive polycrystalline layer has substantial thickness, e.g. ranging from 2.0 mm to 4.0 mm. The increased uniformity and effectiveness of catalyst diffusion resulting from the diffusion bridge matrix increases ability to achieve an acceptable quality of PCD. Importantly, the diffusion bridge matrix can contribute to reduction or elimination of cracking and/or layer delamination problems occurring at the interface of the superabrasive polycrystalline layer 20 and the support substrate 16, and the interface of the superabrasive polycrystalline layer-and the metal working layer 22 during high pressure high temperature sintering. Layer delamination is typically a major dominant failure of typical sandwich PCD products, particularly in tools having a relatively thick polycrystalline layer.

Additionally, the diffusion bridge matrix further provides an additional metallic phase at the interface between the superabrasive polycrystalline layer and the support substrate, and the interface between the superabrasive metal working layer through a solid welding or bonding between the diffusion bridge matrix material and the tungsten carbide of the support substrate and metal working layer in the presence of a catalyst binder or sintering aid under high pressure high temperature sintering. The additional metallic phase overcomes the inherent residual stress generated from the bonding of two distinct materials (e.g. diamond and metal carbide) and minimizes or eliminates resultant delamination at the interfaces of tungsten carbide and superabrasive polycrystalline material.

Figure 7:
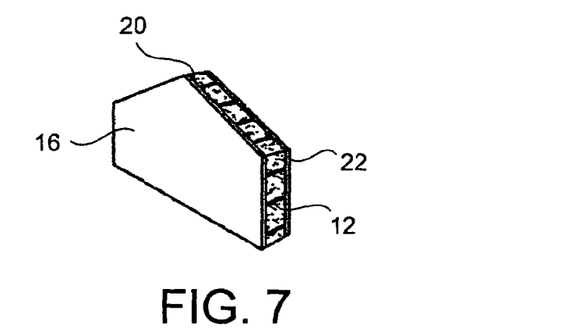
FIG. 7 shows a perspective view of a polycrystalline superabrasive composite tool for use as a drill tip sandwich segment.

In one embodiment, the polycrystalline composite tool of the present invention comprising a support substrate 16, a superabrasive polycrystalline layer 20, and a metal working layer 22 can be configured for use as a drill bit sandwich segment as is shown in FIG. 7.

Figure 8:
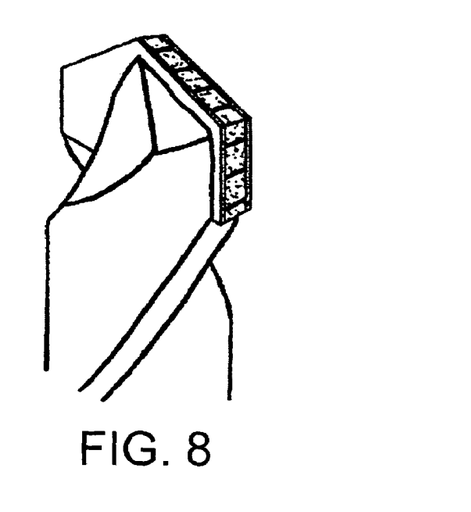
FIG. 8 shows a perspective view of a polycrystalline superabrasive composite tool for use as a drill tip segment and brazed on the drill tip.
Figure 9:
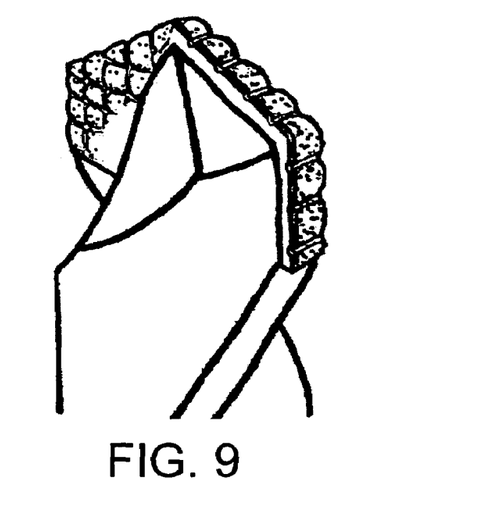
FIG. 9 shows a magnified view of the cutting face of a polycrystalline superabrasive composite tool of FIG. 8 after use and wear in accordance with one embodiment of the present invention.

The polycrystalline superabrasive composite tools of the present invention can be attached to a tool body to produce an abrasive polycrystalline tool. Attachment to a tool body can be accomplished by any known method such as brazing, gluing, welding, clamping, interference fitting or other similar methods. The polycrystalline article or superabrasive polycrystalline tool can be attached along at least a portion of the support substrate to the tool body. Thus, as can be seen in FIG. 8, a superabrasive polycrystalline tool in the form of a drill bit sandwich segment can be brazed on a drill tip. FIG. 9 is a magnified view of the cutting face of a sandwich segment brazed on a drill tip after wear and use while rotating counterclockwise. In a similar manner as described with FIGS. 2 and 3, the softer diffusion bridge matrix wears more readily allowing the segmented portions of the polycrystalline layer to individually wear to maintain multiple cutting surfaces. Although any known braze can be used, those skilled in the art will recognize various factors which affect the composition of the braze chosen for a particular purpose and such braze materials can be chosen by those skilled in the art.

In an additional aspect of the present invention, any of the embodiments disclosed herein can include a superabrasive polycrystalline layer having superabrasive particles of different average particle size. By adjusting the superabrasive particle size, the abrasiveness, cutting speed, and cutting quality can be tailored to obtain specific abrasive and/or cutting characteristics.

EXAMPLES

The following examples illustrate various methods of making polycrystalline superabrasive composite tools in accordance with the present invention. However, it is to be understood that the following are only exemplary or illustrative of the application of the principles of the present invention. Numerous modifications and alternative compositions, methods, and systems can be devised by those skilled in the art without departing from the spirit and scope of the present invention. The appended claims are intended to cover such modifications and arrangements. Thus, while the present invention has been described above with particularity, the following Examples provide further detail in connection with several specific embodiments of the invention.

Example 1

A cobalt cemented tungsten carbide substrate measuring 7.0 mm in thickness and 39.5 mm in diameter was pretreated by alcohol washing. A grid diffusion bridge matrix or individual square was formed from a nickel foil consisting essentially of 95 vol % nickel and 5 vol % cobalt. The grid had walls of 3.5 mm in height and square openings of 5.0 mm by 5.0 mm in size. The diffusion bridge was cut to the dimensions of the substrate and placed thereon. A mixture of 25 to 35 microns diamond powder was carefully filled to a thickness of 5.0 mm and the reaction cup-assembly was firmly compressed to consolidate the packed diamond as well as confirming the straightness of the cup-assembly. The PCD cell including this pressed reaction cup-assembly was then placed in a high pressure and high temperature hydraulic press at 1400° C. for about 30 minutes and was then allowed to cool to room temperature. The sintered PCD was finished by conventional grinding and lapping processes into a final PCD of 38 mm in diameter and 8.0 mm in thickness. The final product further had a high-quality PCD layer of 3.0 mm thick which was embedded with a diffusion bridge matrix.

Example 2

A cobalt cemented tungsten carbide substrate measuring 4.0 mm in thickness and 39.5 mm in diameter was pretreated by alcohol washing. A grid diffusion bridge matrix was welded using a 0.15 mm thick pure nickel foil. The grid design was a honeycomb rectangular form of 4 mm by 4 mm grid and a height of 3.5 mm. A diamond micron powder measuring 4 micron to 6 micron was prepared using a hydrogen firing at 900° C. for 2 hours. The cobalt cemented tungsten carbide substrate was inserted into a cleaned tantalum cup having an inner diameter of 40.0 mm to a thickness of about 9.0 mm. The grid diffusion bridge matrix was then placed on top of the substrate inside the tantalum cup. The diamond micron powder was poured over the diamond bridge matrix so that it measured about 2 mm to 3 mm beyond the top of the diamond bridge matrix to allow for compression and shrill under high pressure. A typical high pressure high temperature condition was applied at 1400° C. for about 25 minutes for sintering and then allowed to cool to room temperature. The sintered PCD was finished by conventional grinding and lapping processes into a final PCD of 38.0 mm diameter and 6.0 mm thick with a PCD layer of 3.2 mm having a diffusion bridge matrix embedded inside the entire PCD layer.

Example 3

The method of forming a similar polycrystalline superabrasive composite tool to Example 2 was repeated with a grid diffusion bridge matrix made with a 0.20 mm thick pure molybdenum foil and using different diamond powders. In this example, a bonding agent of tungsten carbide and silicon powder was mixed with 4 to 6 micron diamond powder. The weight ratio of feed mixture was 85% diamond and 15% bonding agent. The bonding agent itself was 97 wt % tungsten carbide powder (measuring about 1 to 2 micron) and 3 wt % silicon powder (measuring 1 micron). The metal grid, PCD configuration, and high pressure and high temperature conditions of Example 2 were applied. The appearance of the polycrystalline diamond composite tool from HPHT sintering was similar to that in Example 2. However, the PCD composite tool of the present example was characterized by a more thermally stable PCD layer than the one of Example 2 due to more stable carbide formers but less cobalt sintering aids in the diamond matrix. Thus, the PCD composite tool was more thermally stable than other conventional PCD and that of Example 2.

Example 4

A Mo-diffusion bridge matrix assisted sandwich PCD was prepared under typical HPHT conditions. The preparation of the PCD cell for the HPHT sintering was very similar to other examples. Loading of 4 to 6 micron diamond powder mixed with bonding agent of only tungsten powder was made into the pre-assembled tantalum cup with a disc of tungsten carbide and a grid of a molybdenum diffusion bridge matrix. Another layer (disc) of tungsten carbide was placed on top of diamond filled diffusion bridge matrix and tungsten carbide disc assembled in tantalum cup. The finished PCD had a PCD layer of 3.0 mm thick embedded with a molybdenum diffusion bridge matrix sandwiched by two layers of tungsten carbide substrate on either side. The final PCD is illustrated in FIG. 6.

The finished sandwich PCD was wire EDM cut into multiple chevron shaped sandwich PCD segments as illustrated in FIG. 7. One of the chevron segments was then brazed onto the tip of the cemented tungsten carbide drill shank for making a percussion masonry drill (similar to FIG. 8). This drill was then finished and shaped into the final drill geometry by using a typical diamond wheel. The drill was successfully tested on a gravel aggregated concrete material with excellent results.

Example 5

A molybdenum bridge matrix assisted sandwich PCD was fabricated under the same HPHT condition applied in Example 4 except for the diamond feed used in this example was a mixture of 40 vol % of 2 to 3 micron diamond and 60 vol % of stable carbide forming metal binders like 1 to 2 micron tungsten or tungsten carbide powder. The final sandwich PCD obtained from finishing operations included a 1.0 mm thick tungsten carbide layer, a 4.0 mm thick PCD layer embedded with a Mo-diffusion bridge matrix in the middle, and another 4.0 mm thick tungsten carbide layer opposite the first tungsten carbide layer and bonded to one another as a triple layer sandwich segment under in-situ HPHT conditions.

The finished sandwich PCD was then wire EDM cut vertically from the top 1.0 mm thick WC layer through the PCD to the bottom WC layer into many small round drill bit PCD tips (i.e. 4.5 mm, 6.0 mm, 8.0 mm, 10.0 mm, 12.0 mm, and 15.0 mm in diameter) each consisting of three layers, 1.0 mm WC/4.0 mm PCD/4.0 mm WC layers as a pre-finished PCD drill. One of the 4.5 mm diameter round as-cut PCD drill was then fit and brazed into the tip (e.g. slot of a tip) of a tungsten carbide drill shank by inserting and then brazing prior to shaping of the drill. Both top WC layer and PCD section were then shaped with diamond wheels for forming helical cutting blades around the circumferential area of the PCD. As the PCD can be readily machined by grinding, the helical shape cutting segment was rather easily obtained and a final helical PCD drill geometry was obtained for the subsequent drilling of carbon composite materials, aluminum sheets, or cement boards. The final helical PCD drill demonstrated a very promising performance in drilling several holes through an aluminum sheet material.

Of course, it is to be understood that the above-described arrangements are only illustrative of the application of the principal of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:

1. A polycrystalline superabrasive composite tool, comprising:
    (a) a support substrate;
    (b) a superabrasive polycrystalline layer having a diffusion bridge matrix embedded therein, said diffusion bridge matrix including a carbide former;
    (c) a metal working layer adjacent to the superabrasive polycrystalline layer and opposite the support substrate, wherein the diffusion bridge matrix forms a metallic phase at each of an interface between the support substrate and the superabrasive polycrystalline layer, and an interface between the superabrasive polycrystalline layer and the metal working layer, the support substrate, the superabrasive polycrystalline layer and the metal working layer forming a drill bit sandwich segment; and (d) a drill bit having the drill bit sandwich segment attached to a drill tip of the drill bit such that portions of the diffusion bridge matrix are exposed along contact working surfaces and oriented substantially normal to each of the support substrate and the metal working layer.

2. The polycrystalline superabrasive composite tool of claim 1, wherein the carbide former comprises a member selected from the group consisting of molybdenum, tungsten, tantalum, zirconium, vanadium, and mixtures or composites thereof.

3. The polycrystalline superabrasive composite tool of claim 1 wherein the diffusion bridge matrix has a thickness that is equal to a thickness of the superabrasive polycrystalline layer.

4. The polycrystalline superabrasive composite tool of claim 1 wherein the diffusion bridge matrix has a thickness that is less than a thickness of the superabrasive polycrystalline layer.

5. The polycrystalline superabrasive composite tool of claim 1 wherein the diffusion bridge matrix has a thickness that is greater than a thickness of the superabrasive polycrystalline layer.

6. The polycrystalline superabrasive composite tool of claim 1, wherein the diffusion bridge matrix segments portions of the superabrasive polycrystalline layer.

7. The polycrystalline superabrasive composite tool of claim 1, wherein the diffusion bridge matrix is a structure selected from the group consisting of walled multi-cell matrix, mesh, and combinations thereof.

8. The polycrystalline superabrasive composite tool of claim 1, wherein the diffusion bridge matrix further comprises a sintering aid.

9. The polycrystalline superabrasive composite tool of claim 2, wherein the superabrasive polycrystalline layer has a thickness ranging from about 2.0 mm to about 4.0 mm.

10. The polycrystalline superabrasive composite tool of claim 1, wherein the support substrate and the metal working layer comprise tungsten carbide.

11. The polycrystalline superabrasive composite tool of claim 1, wherein the diffusion bridge matrix extends from the support substrate through the superabrasive polycrystalline layer to the metal working layer.

12. The polycrystalline superabrasive composite tool of claim 1, wherein the metal working layer and the support substrate have thicknesses which differ by about 10% to about 100%.

13. The polycrystalline superabrasive composite tool of claim 1, wherein the polycrystalline superabrasive composite tool is configured for use as a drill bit sandwich segment.

14. The polycrystalline superabrasive composite tool of claim 1, wherein the support substrate comprises a refractory metal carbide.

15. A method of forming a polycrystalline superabrasive composite tool, comprising the steps of:
(a) embedding a diffusion bridge matrix in a particulate superabrasive layer disposed on a support substrate, said diffusion bridge matrix including a carbide former;
(b) adding a metal working layer adjacent to the particulate superabrasive layer and opposite the support substrate prior to bonding such that the diffusion bridge matrix is substantially normal to each of the support substrate and the metal working layer;
(c) bonding the support substrate and the particulate superabrasive layer to form a polycrystalline superabrasive compact, wherein the support substrate, the superabrasive layer and the metal working layer form a drill bit sandwich segment; and
(d) attaching the drill bit sandwich segment to a drill tip of a drill bit such that portions of the diffusion bridge matrix are exposed along contact working surfaces.

16. The method of claim 15, wherein the diffusion bridge matrix further comprises a sintering aid.

17. The method of claim 16, wherein the sintering aid is present in an amount from about 2 to about 50 volume percent.

18. The method of claim 15, wherein the particulate superabrasive layer includes a sintering aid.

19. The method of claim 15, wherein the carbide former is a member selected from the group consisting of molybdenum, tungsten, tantalum, zirconium, vanadium, and mixtures or composites thereof.

20. The method of claim 15, wherein the step of embedding is accomplished by first placing the diffusion matrix bridge on the support substrate and then covering the diffusion matrix bridge with superabrasive particles.

21. The method of claim 15, wherein the diffusion matrix bridge is a walled multi-cell matrix.

22. The polycrystalline superabrasive tool of claim 1, wherein the tool is substantially free of layer delamination and cracking at the interface of the superabrasive polycrystalline layer and the metal working layer during high pressure high temperature sintering.

23. The polycrystalline superabrasive tool of claim 1, wherein the tool is substantially free of layer delamination and cracking at the interface of the superabrasive polycrystalline layer and the support substrate during high pressure high temperature sintering.

24. A polycrystalline superabrasive composite tool formed by the method of claim 15.

* * * * *

UNITED STATES PATENT AND TRADEMARK OFFICE
CERTIFICATE OF CORRECTION

PATENT NO. : 7,585,342 B2
APPLICATION NO. : 11/495807
DATED : September 8, 2009
INVENTOR(S) : Hyun Sam Cho It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 248 days.

Signed and Sealed this

Fourteenth Day of September, 2010

David J. Kappos
*Director of the United States Patent and Trademark Office*